United States Patent
Shindo et al.

(10) Patent No.: US 12,003,674 B2
(45) Date of Patent: Jun. 4, 2024

(54) INFORMATION PROCESSING FOR COLORIMETRY OPERATION GENERATING A CHART WITH READ RESULT PATCHES ARRANGED ADJACENT CORRESPONDING REFERENCE PATCHES

(71) Applicant: CANON KABUSHIKI KAISHA, Tokyo (JP)

(72) Inventors: Yukihiro Shindo, Chiba (JP); Hidekazu Nakashio, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/297,959

(22) Filed: Apr. 10, 2023

(65) Prior Publication Data
US 2023/0353687 A1    Nov. 2, 2023

(30) Foreign Application Priority Data
Apr. 27, 2022  (JP) .................................. 2022-073679

(51) Int. Cl.
H04N 1/00   (2006.01)
H04N 1/107  (2006.01)
H04N 1/60   (2006.01)

(52) U.S. Cl.
CPC ..... *H04N 1/00034* (2013.01); *H04N 1/00076* (2013.01); *H04N 1/6033* (2013.01); *H04N 1/00058* (2013.01); *H04N 1/107* (2013.01)

(58) Field of Classification Search
CPC ..... H04N 1/00045; H04N 1/6033–605; H04N 1/00442–00453
See application file for complete search history.

(56) References Cited

U.S. PATENT DOCUMENTS 7,130,076 B2 * 10/2006 Shibuya ............... H04N 1/6033
                                                   358/1.9
8,498,029 B2 *  7/2013 Yamamoto ........... H04N 1/6033
                                                   358/1.9
8,681,375 B2 *  3/2014 Katayama ............ H04N 1/6055
                                                   358/1.9

(Continued)

FOREIGN PATENT DOCUMENTS

JP    2001088357 A  *  4/2001
JP    2009288027 A     12/2009

*Primary Examiner* — Scott A Rogers
(74) *Attorney, Agent, or Firm* — ROSSI, KIMMS & McDOWELL LLP

(57) ABSTRACT

An information processing apparatus comprises acquiring information related to a chart to be printed, the chart including a plurality of patches arranged adjacent to each other; causing a display unit to display a plurality of patch displays according to a plurality of expected colors of the plurality of patches being acquired, and a procedure of sequentially measuring, by a colorimetric apparatus, the plurality of patches formed on the chart; sequentially acquiring measured values measured by the colorimetric apparatus; and sequentially displaying objects indicating measured colors, based on the measured value for each patch being acquired in a manner superimposed on a part of the patch display according to a corresponding expected color such that a display portions of the expected colors are connected between at least one pair of adjacent patch displays even after the objects are displayed.

14 Claims, 8 Drawing Sheets

(56) References Cited

U.S. PATENT DOCUMENTS

| | | | | |
|---|---|---|---|---|
| 8,773,715 B2* | 7/2014 | Katayama | ............... | G01J 3/52 |
| | | | | 358/1.9 |
| 8,786,898 B2* | 7/2014 | Katayama | ............ | H04N 1/6058 |
| | | | | 358/1.9 |
| 10,367,975 B2* | 7/2019 | Kurumaya | ............... | G01J 3/52 |
| 2008/0231876 A1* | 9/2008 | Harada | ................. | H04N 1/41 |
| | | | | 358/1.9 |
| 2009/0296118 A1 | 12/2009 | Tsukamoto | | |
| 2013/0307866 A1* | 11/2013 | Arai | .................. | G09G 5/003 |
| | | | | 345/594 |
| 2022/0172334 A1* | 6/2022 | Takeuchi | ............ | G06T 7/0002 |

\* cited by examiner

FIG. 6

DATA STORAGE UNIT

CHART INFORMATION (600)

PATCH SIZE(mm):patch_x_size, patch_y_size
NUMBER OF PATCH COLUMN (x DIRECTION):x_patch_num
NUMBER OF PATCH ROW (y DIRECTION):y_patch_num
COLORIMETRY ORDER (ORIGIN):measurement_order

| x POSITION | y POSITION | C | M | Y | K |
|---|---|---|---|---|---|
| 1 | 1 | C11 | M11 | Y11 | K11 |
| 1 | 2 | C12 | M12 | Y12 | K12 |
| ... | ... | ... | ... | ... | ... |
| x | y | Cxy | Mxy | Yxy | Kxy |
| ... | ... | ... | ... | ... | ... |

STANDARD PROFILE (610)

| C | M | Y | K | L | a | b |
|---|---|---|---|---|---|---|
| ... | ... | ... | ... | ... | ... | ... |
| Cs | Ms | Ys | Ks | Ls | as | bs |
| ... | ... | ... | ... | ... | ... | ... |

MONITOR PROFILE (620)

| L | a | b | R | G | B |
|---|---|---|---|---|---|
| ... | ... | ... | ... | ... | ... |
| Lm | am | bm | Rm | Gm | Bm |
| ... | ... | ... | ... | ... | ... |

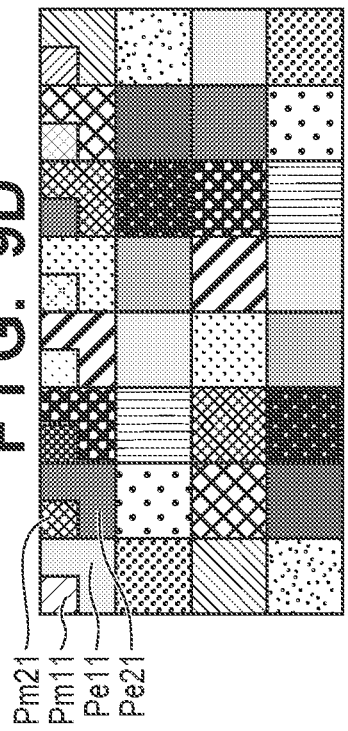
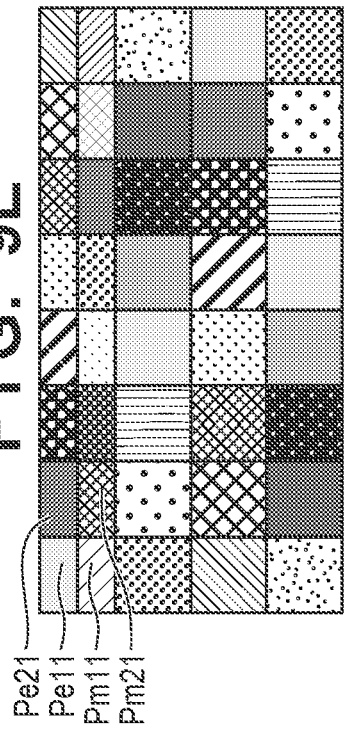
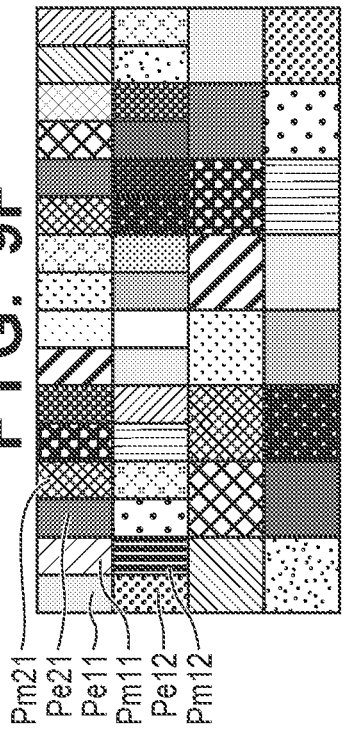
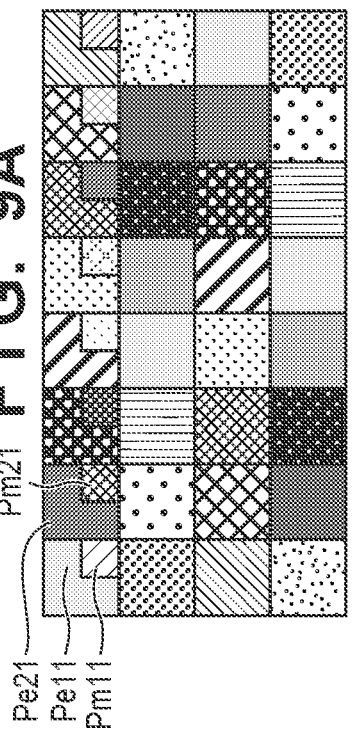
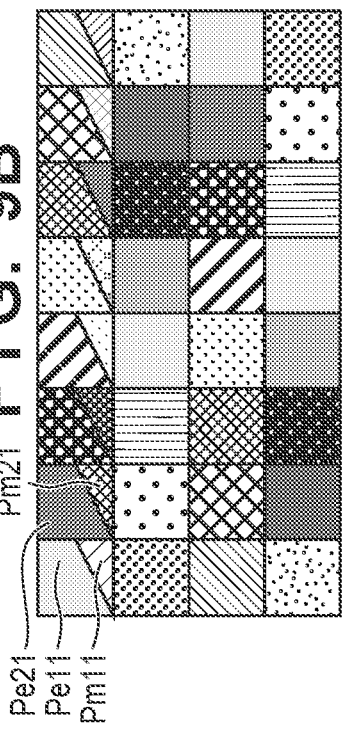
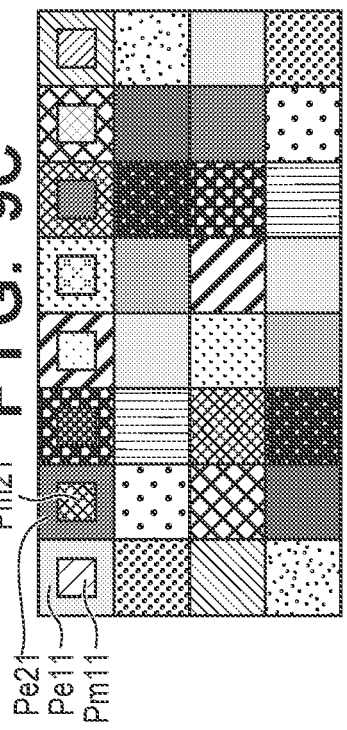

INFORMATION PROCESSING FOR COLORIMETRY OPERATION GENERATING A CHART WITH READ RESULT PATCHES ARRANGED ADJACENT CORRESPONDING REFERENCE PATCHES

BACKGROUND OF THE INVENTION

Field of the Invention

The present invention relates to an information processing apparatus configured to perform colorimetry, a control method thereof, and a storage medium.

Description of the Related Art

In order to maintain the quality of color printed materials for sale, any printing company or the like regularly performs colorimetry of a color of printed materials output from a printing apparatus and performs color adjustment for the printing apparatus based on the result of the colorimetry. Specifically, the color adjustment is performed by outputting original image data referred to as a color chart from the printing apparatus, and performing colorimetry of respective patches arranged on the output color chart by a colorimetric apparatus. And then, the shifting amount of color between the actual measured value and the target value of each patch is evaluated, and the color adjustment is performed for the printing apparatus according to the evaluation result.

Further, in the management of the color of printed materials output from the printing apparatus, cases are increasing in which a colorimetric apparatus (including a scanner) is used in order for accurate management. Some of the colorimetric apparatuses being used performs colorimetry of the chart through manual operation by a user. Since it is necessary to perform colorimetry of a large number of charts with patches aligned thereon, there is a possibility of erroneously recognizing the chart to be performed colorimetry.

Upon this, Japanese Patent Application Laid-Open No. 2009-288027 discloses displaying by surrounding with a thick frame in order to facilitate visual recognition of a colorimetric patch in an information processing apparatus. Further, in order to detect a colorimetry operation error with high accuracy, a colorimetry error in a patch is determined by acquiring a color difference between a measured value and a predetermined reference value for a plurality of patches, and comparing the cumulative color difference with a predetermined threshold value.

SUMMARY OF THE INVENTION

However, the conventional technology described above has a problem described below. The aforementioned conventional technology requires, in order to automatically determine a colorimetric error by the information processing apparatus, a preliminary setting of reference values for patch including profile conditions at printing and a color difference threshold value for determining a colorimetric error. Therefore, the color difference threshold values to be set become complicated in order to enable determination of an operation error caused by colorimetry of other chart or patch.

The present invention enables realization of a mechanism that allows colorimetry operation errors to be easily checked while occurrence of colorimetry operation errors is suppressed.

One aspect of the present invention provides an information processing apparatus comprising: at least one memory device that stores a set of instructions; and at least one processor that executes the set of instructions to: acquire information related to a chart to be printed by a printing apparatus, the chart including a plurality of patches arranged adjacent to each other, cause a display unit to display a plurality of patch displays according to a plurality of expected colors of the plurality of patches being acquired, and a procedure of sequentially measuring, by a colorimetric apparatus, the plurality of patches formed on the chart, sequentially acquire measured values measured by the colorimetric apparatus for each patch, and sequentially display objects indicating measured colors, based on the measured value for each patch being acquired, in a manner superimposed on a part of the patch display according to a corresponding expected color such that display portions of the expected colors are connected each other between at least one pair of adjacent patch displays even after the objects are displayed.

Another aspect of the present invention provides a control method for an information processing apparatus, comprising: acquiring information related to a chart to be printed by a printing apparatus, the chart including a plurality of patches arranged adjacent to each other; causing a display unit to display a plurality of patch displays according to a plurality of expected colors of the plurality of patches being acquired, and a procedure of sequentially measuring, by a colorimetric apparatus, the plurality of patches formed on the chart; sequentially acquiring measured values measured by the colorimetric apparatus for each patch; and sequentially displaying objects indicating measured colors, based on the measured value for each patch being acquired in a manner superimposed on a part of the patch display according to a corresponding expected color such that a display portions of the expected colors are connected each other between at least one pair of adjacent patch displays even after the objects are displayed.

Still another aspect of the present invention provides a non-transitory computer-readable storage medium storing a computing program for causing a computer to execute each process of a control method of an information processing apparatus, the control method comprising: acquiring information related to a chart to be printed by a printing apparatus, the chart including a plurality of patches arranged adjacent to each other; causing a display unit to display a plurality of patch displays according to a plurality of expected colors of the plurality of patches being acquired, and a procedure of sequentially measuring, by a colorimetric apparatus, the plurality of patches formed on the chart; sequentially acquiring measured values measured by the colorimetric apparatus for each patch; and sequentially displaying objects indicating measured colors, based on the measured value for each patch being acquired in a manner superimposed on a part of the patch display according to a corresponding expected color such that a display portion of the expected colors are connected each other between at least one pair of adjacent patch displays even after the objects are displayed.

Further features of the present invention will be apparent from the following description of exemplary embodiments with reference to the attached drawings.

BRIEF DESCRIPTION OF THE DRAWINGS

FIG. 6 is a diagram illustrating an example of a data structure stored in a data storage unit according to an embodiment;

FIGS. 9A to 9F are diagrams illustrating examples of displaying expected colors and measured colors of charts according to an embodiment;

DESCRIPTION OF THE EMBODIMENTS

Figure 1A:
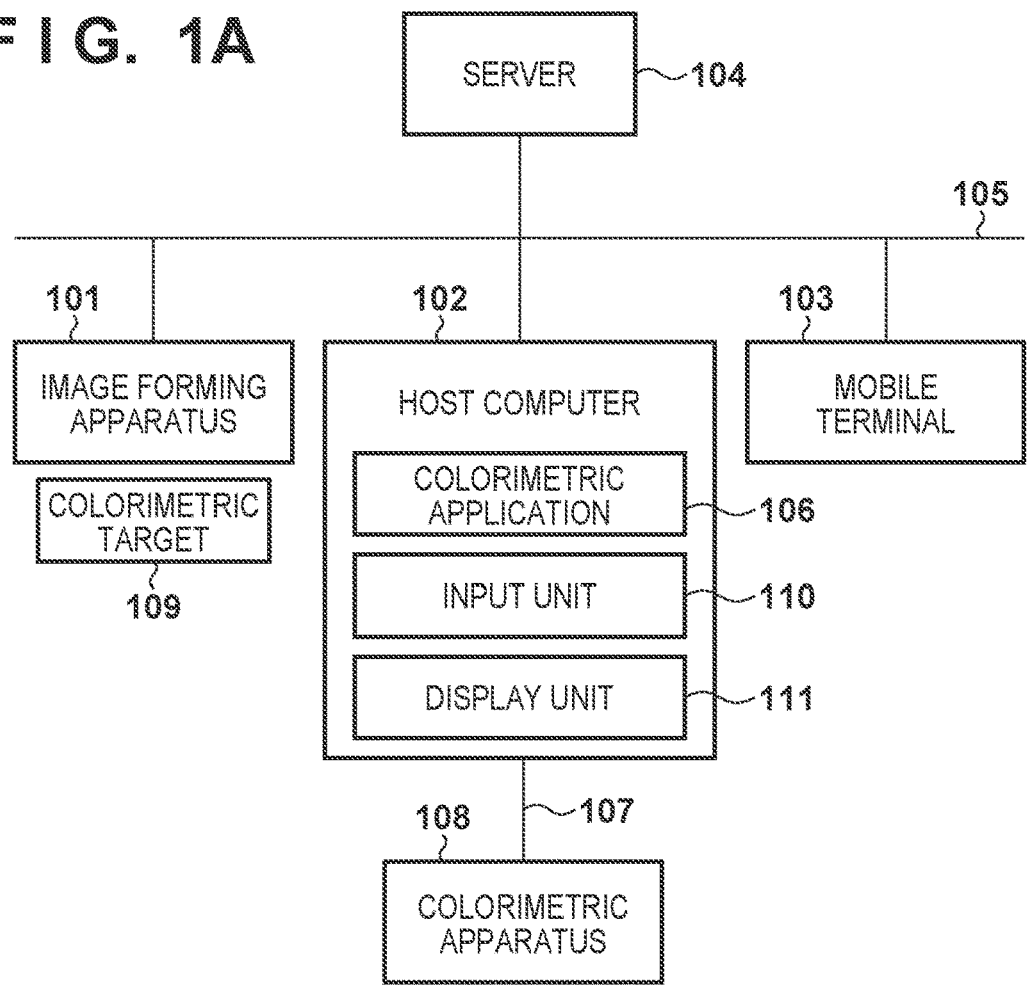
FIG. 1A is a diagram illustrating a configuration example of a system according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

System Configuration

In the following, a first embodiment of the present invention will be described. In the present embodiment, an expected color is displayed in a patch layout on a chart of a measurement target. The present embodiment is characterized in that, when patch measurement is completed, the measured color is displayed in a manner superimposed on a part of the expected color while keeping the adjacent state of the expected colors between adjacent patches. The term "expected color" refers to a color expected at printing for each patch included in the chart. On the other hand, the term "measured color" refers to a color measured by reading a printed chart with a colorimetric apparatus. Note that the described components, including the embodiments described below, are merely examples, and the scope of the present invention is not limited thereto.

System Configuration

First, a configuration example of a system according to the present invention will be described with reference to FIG. 1A. The system is configured by including image forming apparatus 101, a host computer 102, a mobile terminal 103, a server 104, and a colorimetric apparatus 108.

The image forming apparatus 101 prints (image formation) image data held inside the image forming apparatus 101 or received from the host computer 102, the mobile terminal 103, the server 104, or the like via a network 105, to create a colorimetric target 109 which is a chart. The host computer 102, which is an example of an information processing apparatus, executes a colorimetric application 106 with the colorimetric application 106 being installed. The mobile terminal 103, which is a terminal such as a smartphone or a tablet, is communicably connected to other devices via the network 105. The mobile terminal 103 can input a print job to the image forming apparatus 101, instruct the host computer 102 to perform colorimetry to acquire a result, and display the result of colorimetry on the display unit. The server 104, which is communicably connected to other devices via the network 105, provides various services such as a cloud service, and also the server 104 is holding various data and provides these various data in response to requests. In addition, the server 104 may also be configured to execute the colorimetric application to be executed by the host computer 102.

The colorimetric application 106 displays, on the display unit 111 of the host computer 102, an application operation unit, and is operated by using an input unit 110 such as a pointing device, a keyboard, or a touch panel. In addition, the colorimetric application 106 uses a colorimetric apparatus 108, which is connected to the host computer 102 via a USB 107 or the like, to perform colorimetry of a patch of a colorimetric target 109 printed by the image forming apparatus 101.

In the following, description will be given assuming that the colorimetric application 106 is configured to operate on the host computer 102. However, the present invention is not limited to such a configuration, and the colorimetric application 106 may operate on any one of the image forming apparatus 101, the mobile terminal 103 and the server 104, or may be configured to be executed by the image forming apparatus 101, the mobile terminal 103 and the server 104 in a cooperative manner as a distributed processing. Although the colorimetric apparatus 108 is configured to be connected to the host computer 102 via the USB 107, it may also be configured to be connected to the host computer 102 via the network 105.

Configuration of Information Processing Apparatus

Figure 1B:
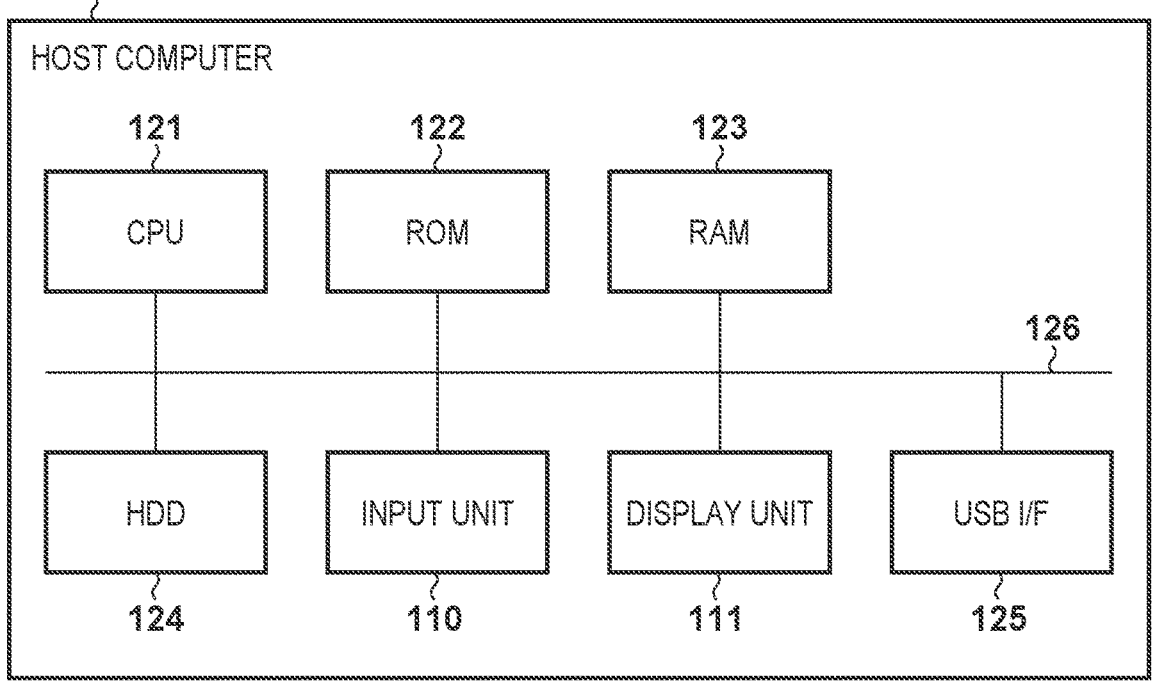
FIG. 1B is a diagram illustrating a configuration example of an information processing apparatus according to an embodiment.

Next, a hardware configuration of the host computer 102 that serves as the information processing apparatus according to the present embodiment will be described with reference to FIG. 1B. The host computer 102 includes a CPU 121, a ROM 122, a RAM 123, an HDD 124, and a USB I/F 125, in addition to the input unit 110 and the display unit 111 illustrated in FIG. 1. The aforementioned components are connected via a bus 126 such that they can exchange data with each other.

The CPU 121 deploys a program stored in the HDD 124 or the ROM 122 to the RAM 123, and executes the program to control the entire process of the host computer 102. The ROM 122 stores a boot program and various data or the like. The RAM 123 temporarily stores various programs or data in execution of a process by the CPU 121, and also provides a work area for storing various data used in the process by the CPU 121. The HDD 124 stores the aforementioned colorimetric application 106, a control program (control software) of the colorimetric apparatus described below, chart information (patch signal, patch layout, patch size, image) related to the colorimetric target 109, or the like. A USB interface (I/F) 125 is an interface configured to connect the colorimetric apparatus 108 or the like, via the USB 107.

Functional Configuration of Colorimetric Application 106

Figure 2:
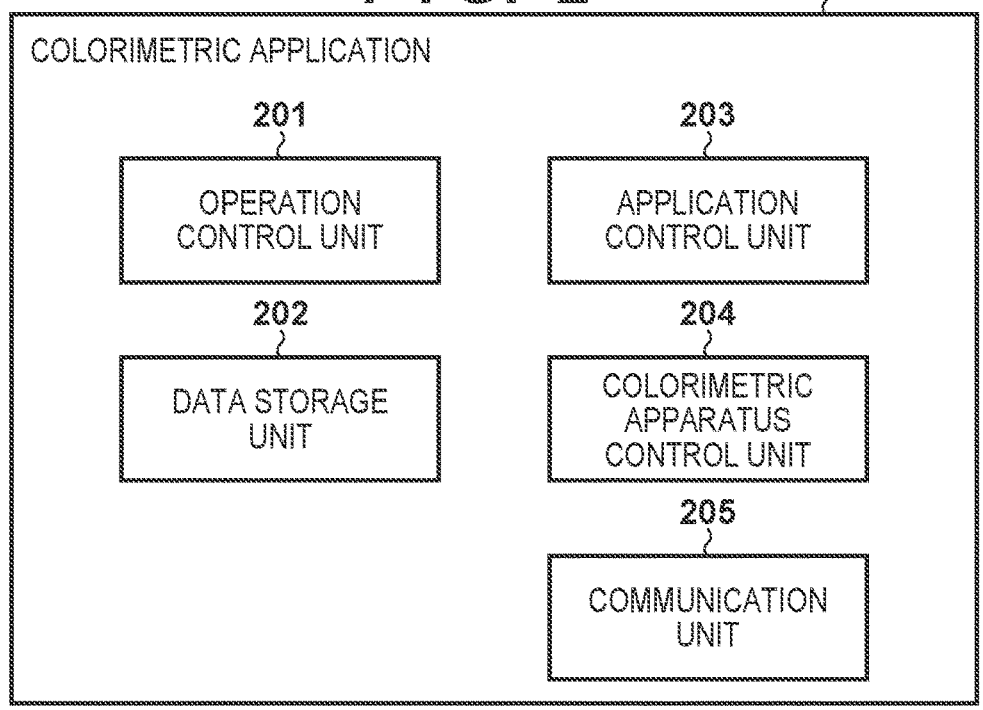
FIG. 2 is a block diagram illustrating a functional configuration of a colorimetric application according to an embodiment.

Next, a functional configuration of the colorimetric application 106 executed by the host computer 102 according to the present embodiment will be described with reference to FIG. 2. The colorimetric application 106 includes an operation control unit 201, a data storage unit 202, an application control unit 203, a colorimetric apparatus control unit 204, and a communication unit 205, as a functional configuration.

The operation control unit 201 controls display of a user operation screen displayed on the display unit 111. In addition, the operation control unit 201 updates screen information upon receiving, from the input unit 110, a notification of pressing a button on the application operation screen or a notification of list selection. In addition, the operation control unit 201 also has a function of performing an event notification to the colorimetric apparatus control unit 204 by the input unit 110, and a function of receiving an event notification from the colorimetric apparatus control unit 204 and updating the screen information.

In addition, the operation control unit 201 has a function of receiving chart information from the data storage unit 202 and converting the information into an "expected color (for operation screen display)" of the chart. Furthermore, the operation control unit 201 has a function of receiving the colorimetric values of the colorimetric target 109 from the colorimetric apparatus control unit 204, and converting the colorimetric values into a "measured color (for operation screen display)" of the chart.

The data storage unit 202 stores chart information (patch signal, patch layout, patch size, and image) held inside or received from the host computer 102, the mobile terminal 103, the server 104, or the like. In addition, the data storage unit 202 also stores a standard profile for converting patch signals into the CIE (Commission Internationale de l'Eclairage) L*a*b* color space, which is a device independent color space. The data storage unit 202 further stores a monitor profile for converting the patch signals converted into the L*a*b* color space into RGB signals that can be displayed on the display unit 111. In the following, L*a*b* will be abbreviated as Lab.

The application control unit 203 controls the operation control unit 201, the data storage unit 202, the colorimetric apparatus control unit 204, and the communication unit 205 to collectively control the entire colorimetric application 106. Upon receiving an event notification from the operation control unit 201, the colorimetric apparatus control unit 204 controls the colorimetric apparatus 108 connected via the communication unit 205. In addition, the colorimetric apparatus control unit 204 receives an event notification from the colorimetric apparatus 108 via the communication unit 205, and notifies the operation control unit 201 of occurrence of the event. In addition, the colorimetric apparatus control unit 204 receives a colorimetric value Lab of the colorimetric target 109 from the colorimetric apparatus 108 and notifies the operation control unit 201.

Colorimetric Application Operation Screen

Figure 5:
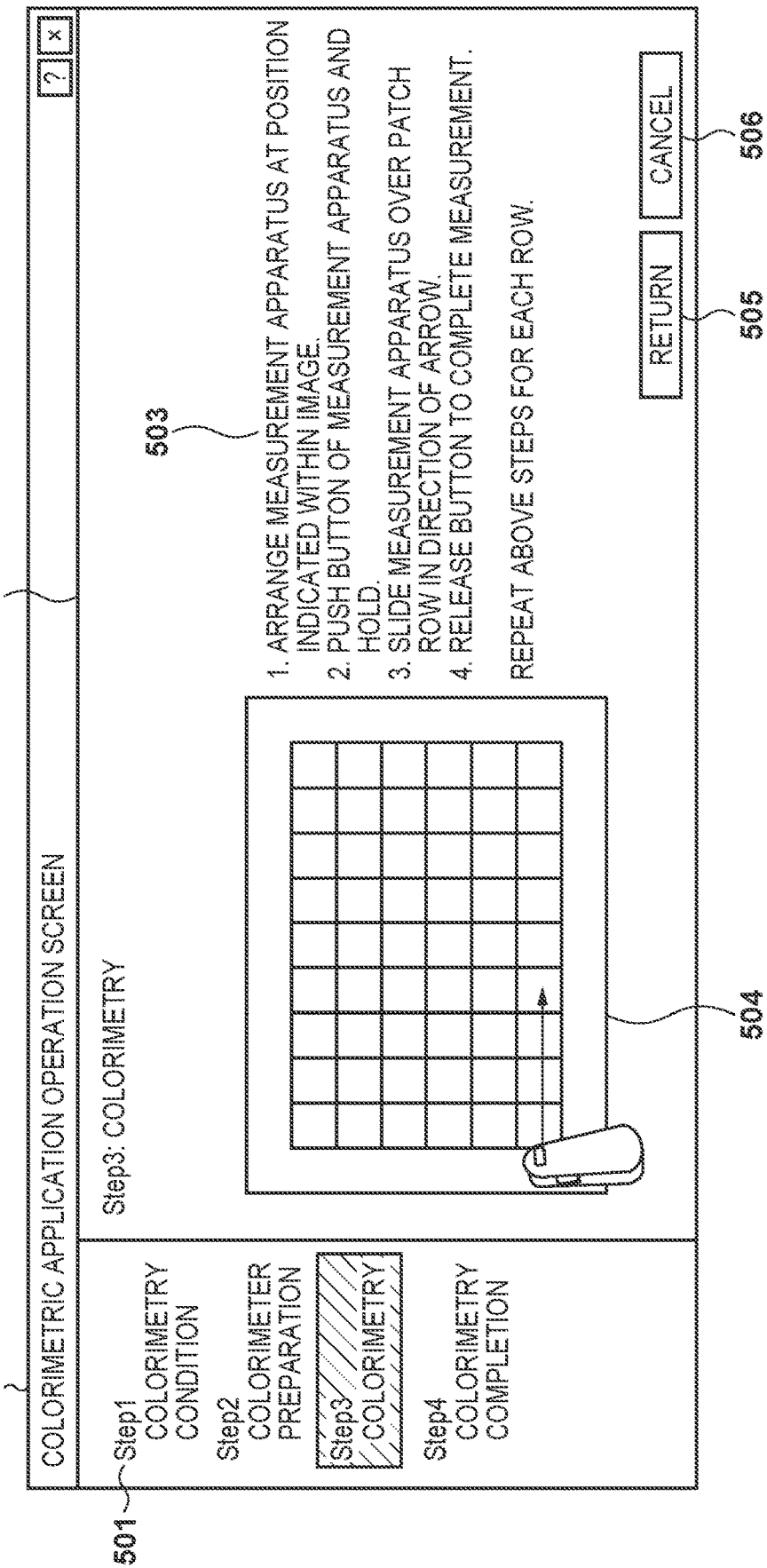
FIG. 5 is a diagram illustrating an example of an operation screen displayed on a display unit by a colorimetric application, according to an embodiment.

Next, an example of an operation screen displayed on the display unit 111 by the colorimetric application 106 according to the present embodiment will be described with reference to FIG. 5. An operation screen 500 includes an area 501 for displaying operation process required for colorimetry operation and an operation process content area 502 indicating the current operation process.

First, each operation process displayed in the area 501 for displaying operation process will be briefly described. At Step 1 (colorimetry condition process), chart information of a colorimetric target is registered or selected, by receiving a notification from the operation control unit 201. At Step 2 (colorimetric apparatus preparation process), the colorimetric application 106 performs a connection request to the colorimetric apparatus. In addition, selection and determination of a colorimetric apparatus to be used, execution of calibration of the colorimetric apparatus, or the like are performed by receiving the event notification from the operation control unit 201 or the colorimetric apparatus. In this way, preparation related to the colorimetric apparatus is performed.

At Step 3 (colorimetry process), colorimetry of a printed material, which is the colorimetric target corresponding to the chart information selected at Step 1 (colorimetry condition process) is performed, by using the colorimetric apparatus determined to be used at Step 2 (colorimetric apparatus preparation process). Here, in FIG. 5, Step 3 (colorimetry process) is displayed to be the current process in an emphasized manner. At Step 4 (colorimetry completion process), inputting a comment of colorimetry operation, storing a result of colorimetry, or the like are performed by receiving a notification from the operation control unit 201.

Next, contents of the operation process content area 502 will be described. FIG. 5 illustrates the contents in Step 3 (colorimetry process). The operation process content area 502 is configured by including a text display area 503, a chart display area 504, a return button 505, and a cancel button 506.

The text display area 503 and the chart display area 504 respectively display the colorimetry operation information by the colorimetric apparatus selected and prepared at Step 2 (colorimetric apparatus preparation process and the chart information selected at Step 1 (colorimetry condition process)). As the colorimetry operation information, a procedure of sequentially measuring a plurality of patches formed on a chart by the colorimetric apparatus is displayed. Although FIG. 5 illustrates the colorimetry operation information for a case where a handy-type manual colorimetric apparatus is selected at Step 2 (colorimetric apparatus preparation process), the present invention is not limited thereto and may use an automatic colorimetric apparatus that performs colorimetry by pulling a chart in.

The chart display area 504 appropriately updates information such as the start position and the slide direction information of the colorimetric apparatus, a patch to be performed colorimetry next, and a colorimetry completed patch and a colorimetry not completed patch, in accordance with the colorimetry operation of the patch. A specific patch display method that is a characteristic of the present invention will be described below. The return button 505, which is a button for returning the operation process to the preceding process, returns the process to the screen of Step 2 (colorimetric apparatus preparation process), since the current process indicating Step 3 (colorimetry process) in the case of FIG. 5. The cancel button 506 is a button for canceling the entire operation process of colorimetry.

External Configuration of Colorimetric Apparatus
108

Figure 3:
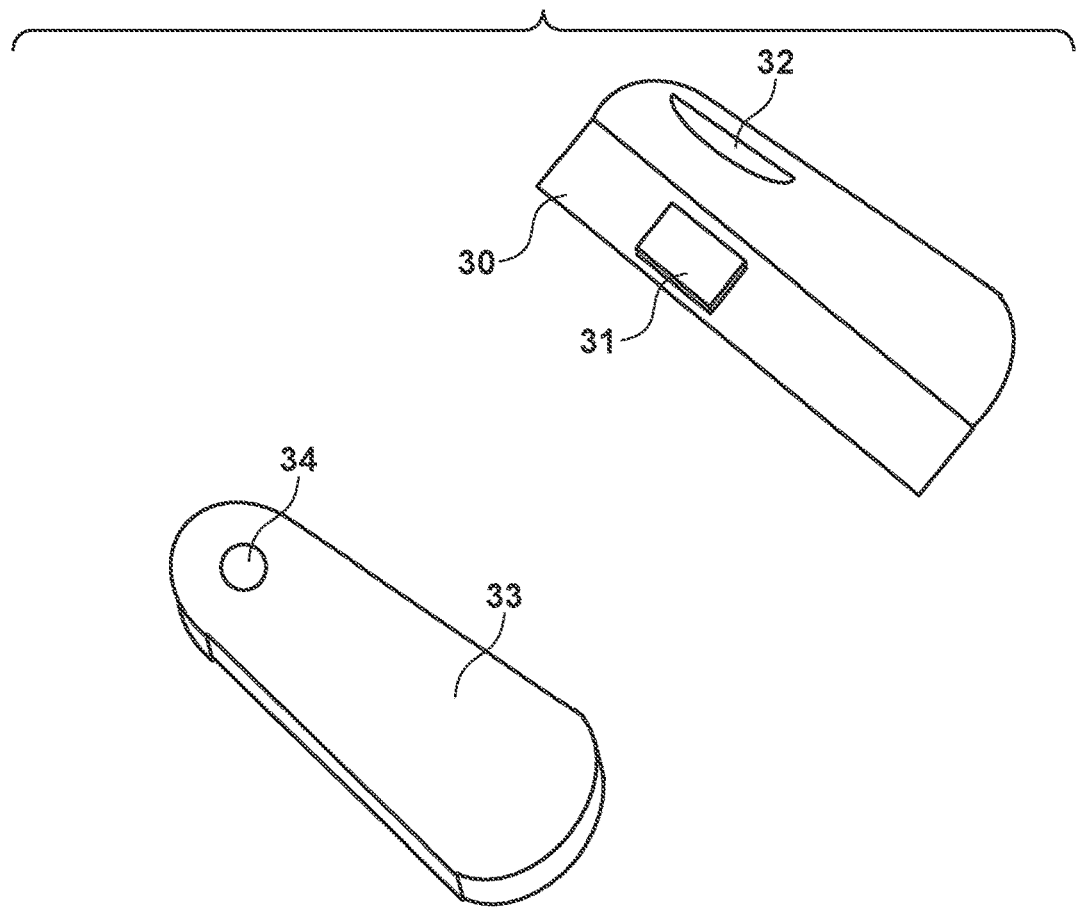
FIG. 3 is a diagram illustrating a configuration example of colorimetric apparatus according to an embodiment.
Figure 4:
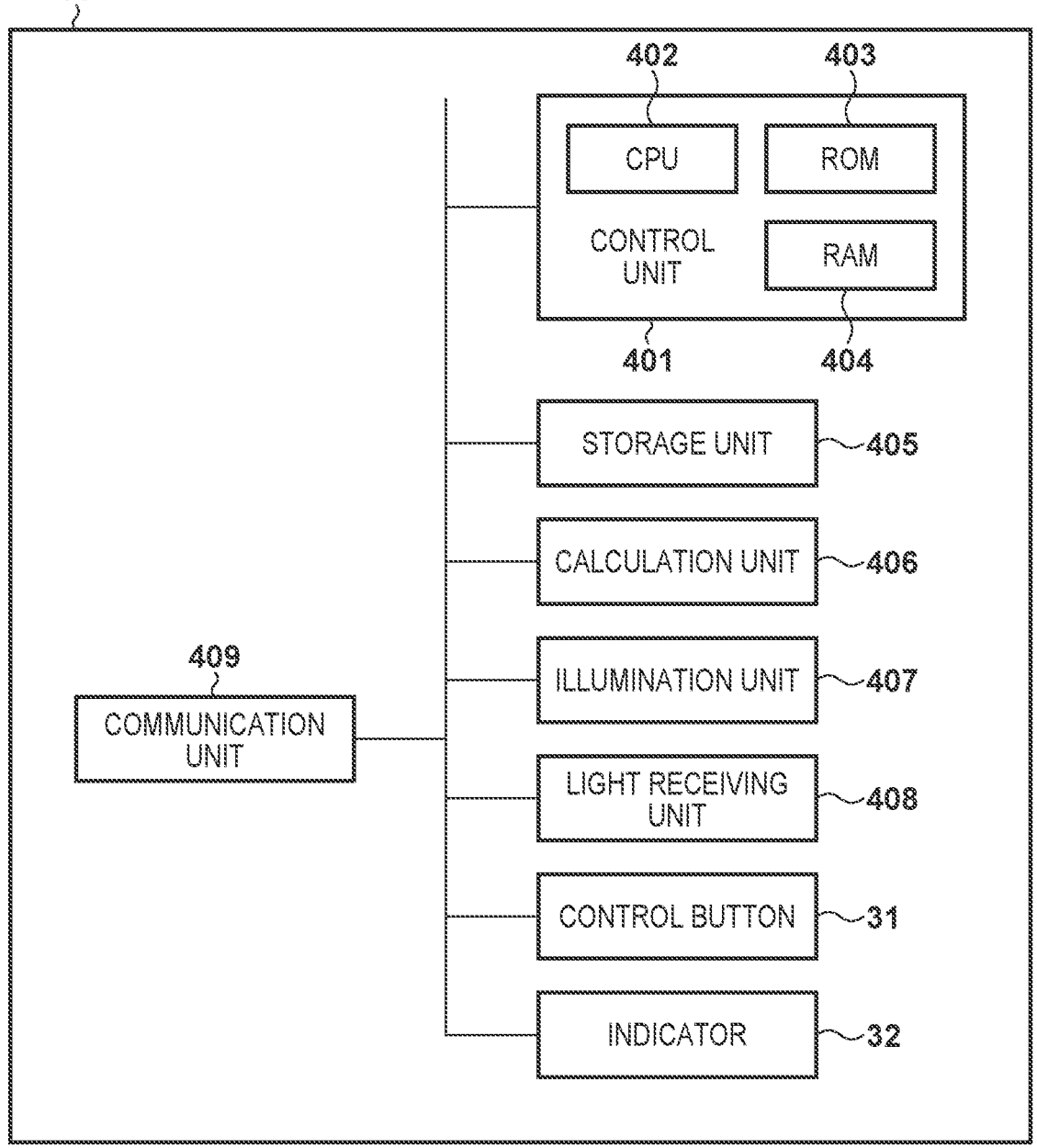
FIG. 4 is a block diagram illustrating a hardware configuration of a colorimetric apparatus according to an embodiment.

Next, an external configuration of the colorimetric apparatus 108 according to the present embodiment will be described with reference to FIG. 3. As illustrated in FIG. 3, the colorimetric apparatus 108 includes a colorimetric apparatus main body 30 and a dock 33 configured to mount the colorimetric apparatus main body 30. The colorimetric apparatus main body 30 has a rounded shape and includes an opening (not illustrated) on the lower surface arranged with respect to the colorimetric target. The dock 33 includes a white member 34 at a position where the colorimetry can be performed when the dock 33 is set to the colorimetric apparatus main body 30.

The colorimetric apparatus main body 30 receives reflected light obtained by irradiating with illumination light from the interior of the main body to the colorimetric target, and perform colorimetry of the colorimetric target based on the reflected light. In addition, the colorimetric apparatus main body 30 has a calibration function for stabilizing the colorimetric value of white color by performing colorimetry of the white member 34 in a state where the colorimetric apparatus main body 30 is mounted on the dock 33. A control button 31 is provided on a side surface of the colorimetric apparatus main body 30, and further, a plurality of indicators 32 including an LED (light emitting diode) lamp or the like are provided at a location above the control button 31.

The control button 31 controls execution of the colorimetric function or the calibration function by the illumination light included in the colorimetric apparatus main body 30. The user can manually perform colorimetry by sliding the colorimetric apparatus on patches formed on a chart that is a colorimetric target in a state where the control button 31 is pressed. Colorimetry can be terminated by changing the control button 31 from the pressed state to the released state. When the control button 31 is pressed and the colorimetry is successfully performed, the result of colorimetry is notified to the colorimetric application 106 operating on the host computer 102 connected to the colorimetric apparatus main body 30 via the USB 107. The indicator 32 displays the control status of the colorimetric apparatus main body 30. The control status being displayed includes success of colorimetry or failure of colorimetry of the patch, for example.

Hardware Configuration of Colorimetric Apparatus Main Body 30 of Colorimetric Apparatus 108

Next, a hardware configuration of the main body 30 of the colorimetric apparatus 108 according to the present embodiment will be described with reference to FIG. 3. The colorimetric apparatus main body 30 includes a control unit 401, a storage unit 405, a calculation unit 406, an illumination unit 407, a light receiving unit 408, and a communication unit 409, in addition to the control button 31 and the indicator 32 illustrated in FIG. 3.

The control unit 401, including a CPU 402, a ROM 403, and a RAM 404, collectively controls the entire colorimetric apparatus main body 30. The CPU 402 operates in accordance with operation programs stored in the ROM 403 or the storage unit 405 to realize the functions of the colorimetric apparatus main body 30. The RAM 404 provides a work area when the CPU 402 operates in accordance with the operation programs.

The illumination unit 407 is configured to irradiate the colorimetric target 109 with illumination light, and the light receiving unit 408 includes a sensor that receives reflected light obtained by irradiating the colorimetric target 109 with illumination light. The illumination light may be only one type or may be selected from a plurality of types. The calculation unit 406 performs calculation for colorimetry according to a known method based on the reflected light received by the light receiving unit 408. In the present embodiment, the calculation unit 406 is realized as a part of the functions of the CPU 402 of the control unit 401. In the present embodiment, the colorimetric result by the calculation unit 406 is transmitted to the colorimetric application 106 operating on the host computer 102 which is USB-connected via the communication unit 409. Here, instead of the colorimetric result by the calculation unit 406, data received by the light receiving unit 408 may be transmitted to the colorimetric application 106 and calculation for colorimetry may be configured to be performed at a side of the colorimetric application 106.

The storage unit 405 includes a nonvolatile memory such as a flash memory, a NAND memory or an EEROM and may be included inside the control unit 401. The storage unit 405 stores a calculation result or the like by the calculation unit 406. The communication unit 409 is a communication interface configured to connect, via the USB 107, with the colorimetric application 106 operating on the host computer 102 and perform data transmission and reception. Here, connection with the host computer 102 is not limited to be performed via the USB, and may be performed via a wired or wireless network.

Data Configuration of Data Storage Unit

Next, data configuration stored in the data storage unit 202 according to the present embodiment will be described with reference to FIG. 6. A part or all of the information stored in the data storage unit 202 may be preliminarily held in the colorimetric application 106, or may be received from the host computer 102, the mobile terminal 103, the server 104 or the like and stored. The data storage unit 202 stores data related to chart information 600, a standard profile 610, and a monitor profile 620.

The chart information 600 has table information, or the like having patch size, numbers of columns and rows of patches, order of colorimetry, and patch formation position indicating the chart layout in association with signal values. The patch formation position is defined by a position in the x direction and a position in the y direction. Although the patch signals are CMYK values in the present embodiment, the patch signals may be RGB values. In addition, although the present embodiment employs a data configuration including patch signals as a part of the chart information, the present invention is not limited thereto. The data configuration may be formed such that the patch signals are separately held as patch definition information and the chart information refers to the patch definition information. Such configuration may be employed because the patch signals to be measured do not depend on the colorimetric apparatus or the colorimetry mode, unlike the patch size, numbers of columns and rows of patches, order of colorimetry, and patch formation position.

The standard profile 610, which is, for example, a profile such as Japan Color used as a standard in the printing industry, indicates a table of color values Lab corresponding to CMYK signal values. It is not necessary to prepare tables corresponding to all the signal patterns, and when it is desired to refer to a color value for a non-existent signal, the color value can be acquired according to a well-known interpolation calculation.

The monitor profile 620, which is a profile used in a general monitor such as sRGB, indicates a table of RGB signal values corresponding to the color values Lab. It is not necessary to prepare tables corresponding to all the color value patterns, and when it is desired to refer to a color value for a non-existent signal, the color value can be acquired according to a well-known interpolation calculation.

Here, the patch signals (CMYK signals) of the chart information 600 are converted into Lab according to the standard profile 610, and further converted into monitor RGB (red, green, blue) signals according to the monitor profile 620. In this way, conversion to "expected colors (for operation screen display)" displayed on the display unit 111 can be performed. Although the foregoing description mentioned the use of the standard profile in order to convert CMYK signals into RGB signals, the gist of the present invention is not limited to this. A well-known conversion formula from CMYK to RGB may be used.

$$R=255\times(255-C)\times(255-K)/(255\times255)$$

$$G=255\times(255-M)\times(255-K)/(255\times255)$$

$$B=255\times(255-Y)\times(255-K)/(255\times255)$$

Here, C/M/Y/K/R/G/B signals are 8-bit signals.

In addition, when the colorimetric application 106 is a system that can grasp even the print condition of the chart, it may utilize the profile used at printing. The colorimetric value Lab acquired by performing colorimetry of the colorimetric target 109 by the colorimetric apparatus 108 can be converted into "measured colors (for operation screen display)" displayed on the display unit 111 by being converted into monitor RGB signals according to the monitor profile 620.

Process Flow of Colorimetry Process

Next, the process of Step 3 (colorimetry process) implemented by the host computer 102 according to the present embodiment executing the colorimetric application 106 will be described with reference to FIG. 7. The process described below is realized, for example, by the CPU 121 of the host computer 102 reading a program of the colorimetric application 106 stored in the ROM 122 or the HDD 124 to the RAM 123 and executing the program.

First, at S701, the CPU 121 functions as a first acquiring unit and, upon proceeding to Step 3 (colorimetry process), acquires, from the data storage unit 202, the chart information 600 of the colorimetric target selected at Step 1 (colorimetry condition process). Subsequently at S702, the CPU 121 uses the standard profile 610 and the monitor profile 620 in the data storage unit 202 to convert the acquired chart information 600 into an "expected color (for operation screen display)" and displays the converted color on the display unit 111. Details of the display method of the "expected color (for operation screen display)" will be described below.

Next, the process proceeds to S703 at which the CPU 121 functions as a second acquisition unit, performs colorimetry of patches of the colorimetric target 109 on a row-by-row basis, for example, using the colorimetric apparatus 108 prepared at Step 2 (colorimetric apparatus preparation process), and sequentially acquires the colorimetric values Lab. Although colorimetry is performed row-by-row in the present embodiment, the present invention is not limited thereto. Colorimetry may be performed in any predetermined units such as patch-by-patch, row-by-row, every two rows, page-by-page or the like, according to the type of the colorimetric apparatus or the operation mode.

Next, the process proceeds to S704 at which the CPU 121 converts the acquired colorimetric values Lab into "measured colors (for operation screen display)" according to the aforementioned method in FIG. 6 using the monitor profile 620 in the data storage unit 202, and sequentially displays objects indicating the measured colors on the display unit 111. Although it is assumed in the present embodiment that updating units of display of measured colors is same with the units of colorimetry, the units are not limited thereto. In other words, although the updating units may be matched to any one of patch-by-patch, row-by-row, every two rows, page-by-page, or the like, other units may be employed. However, according to the present embodiment, display of objects indicating measured colors is sequentially performed in real time matching with the measurement, although there is some time variation. In this way, the user can quickly check the colorimetry operation error. Details of the display method of an object indicating a "measured color (for operation screen display)" will be described below.

Next, the process proceeds to the S705 at which the CPU 121 checks whether or not measurement is completed up to the last patch, and returns to the S703 when there exists an unmeasured patch. When, on the other hand, measurement is completed for all the patches, the process in the flowchart is terminated.

Patch Display Method

The display method of an "expected color (for operation screen display)" at S702 and the display method of a "measured color (for operation screen display)" at S704 described above will be described with reference to FIGS. 8 and 9. The present invention focuses not only on individual patch display method but also on a display method as a patch group. The present invention then provides a patch display method with which a colorimetry operation error can be easily checked while the colorimetry operation error is suppressed in the process of colorimetry operation (before colorimetry, during colorimetry, and after colorimetry).

Figure 8:
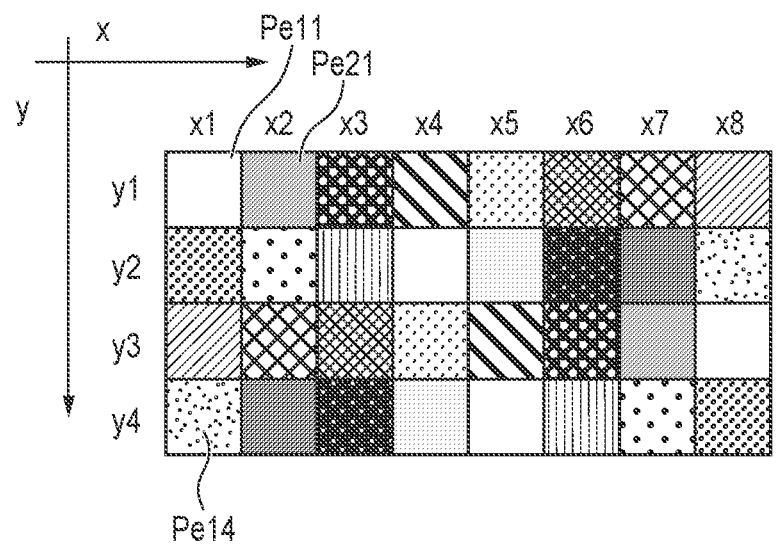
FIG. 8 is a diagram illustrating an example of displaying expected colors of a chart according to an embodiment.

FIG. 8 illustrates a patch group including a plurality of patch displays according to expected colors to be displayed on the display unit 111 at S702 before colorimetry. FIG. 8 illustrates a chart in which a patch size is 10×10 mm, number of patch column (x-direction) is 8 patches and number of patch row (y-direction) is 4 rows, and the order of colorimetry starting from the upper left patch (origin of xy coordinates located at the upper left corner). The expected color of patch coordinates (x, y) will be denoted as Pexy. For example, the expected color of patch coordinates (x, y)=(1, 4) is denoted as "Pe14".

Note that at S702, in order to suppress an operation error of performing colorimetry of a different chart, a plurality of patch displays according to expected colors are displayed to enable checking of patch arrangement, patch size, patch shape, patch color or the like that are characteristics of the chart. The expected colors are displayed with at least the same patch arrangement and patch colors as those of the chart. When an operation error is intended to be further suppressed, it is desirable to display a same patch shape and an equivalent aspect ratio as those of the chart, based on the patch size information.

FIGS. 9A to 9E illustrate an example of displaying, at S704, objects indicating measured colors over one row on the display unit 111. FIG. 9F illustrates an example of displaying, at S704, objects indicating measured colors over two rows on the display unit 111. As illustrated in FIG. 9, the object indicating the measured color is displayed in a manner superimposed on a part of the patch of corresponding expected color that is already displayed. In other words, measured number of rows of patches measured at S703 are converted into objects indicating measured colors and displayed at S704 in a position adjacent to expected colors displayed at S702, whereby the difference between the expected color and the measured color can be easily checked. The measured color of patch coordinates (x, y) will be denoted as Pmxy. For example, the measured color of patch coordinates (x, y)=(2, 1) is denoted as "Pm21".

Generally, the expected color Pexy and the measured color Pmxy do not completely match and are displayed as colors close to each other even in a case where appropriate operation is performed, because there are various deterioration and variation factors in the process of printing, colorimetry and display. In other words, occurrence of a colorimetry operation error cannot be determined only by the occurrence of the difference in appearance between the expected color and the measured color.

Determination is required by distinguishing whether the difference in appearance is due to degradation or variation, or due to a colorimetry operation error caused by performing colorimetry on different chart or patch, for the "magnitude of difference in appearance between the expected color and the measured color". In the present invention, therefore, the expected color and the measured color are firstly displayed adjacent to each other in order to facilitate comparison between the expected color and the measured color. In addition, the present invention is characterized by providing an object display method in which the display change of the patch group associated with displaying an object is suppressed such that the "difference in appearance between the expected color and the measured color" is focused, when the object indicating a measured color is additionally displayed relative to a patch display according to an expected color. The aforementioned features will be specifically described, by using FIGS. 9A to 9F.

Feature 1: The present invention is characterized in that the display portions of the expected colors are connected each other between at least one pair of adjacent patches even after the object indicating a measured color is displayed. In FIGS. 9A to 9E, for example, the expected color Pe11 and the expected color Pe21 are adjacent to each other even after the object of the measured color Pmxy is displayed. Additionally, in FIG. 9F, the expected color Pe11 and the expected color Pe12 are adjacent to each other after the object of the measured color Pmxy is displayed. Note that notation in a colorimetric application is generally written by horizontal writing text as illustrated in FIG. 5, and also the colorimetry direction is generally in the x-axis direction. It is possible to further suppress the perceived change between before colorimetry and after colorimetry, by the display portions of the expected colors being connected each other between patches adjacent to each other particularly in the x-direction, as illustrated in FIGS. 9A to 9E, in accordance with well-known visual guidance patterns (Gutenberg diagram, Z-pattern, F-pattern, etc.).

Feature 2: The present invention is characterized in that the object indicating the measured color Pmxy is different in size or shape from the patch display of the corresponding expected color Pexy, after the object indicating the measured color is displayed, as illustrated in FIGS. 9A to 9D, for example. Assuming that the object of the measured color Pmxy has the same size and shape as the patch display of the expected color Pexy, the expected color is needed to be determined from the arrangement relation between the measured color and the expected color as can be seen in FIG. 9E, and thus which part is the expected color is needed to be determined based on a different piece of information from that before the colorimetry. Therefore, the present invention is characterized in that the patch for the measured color is displayed in different size and shape from the displayed expected color in terms of size and shape of the patch, in order to reduce the inconvenience in such checking. In this way, the user can easily determine which display exhibits the measured color.

Figure 11:
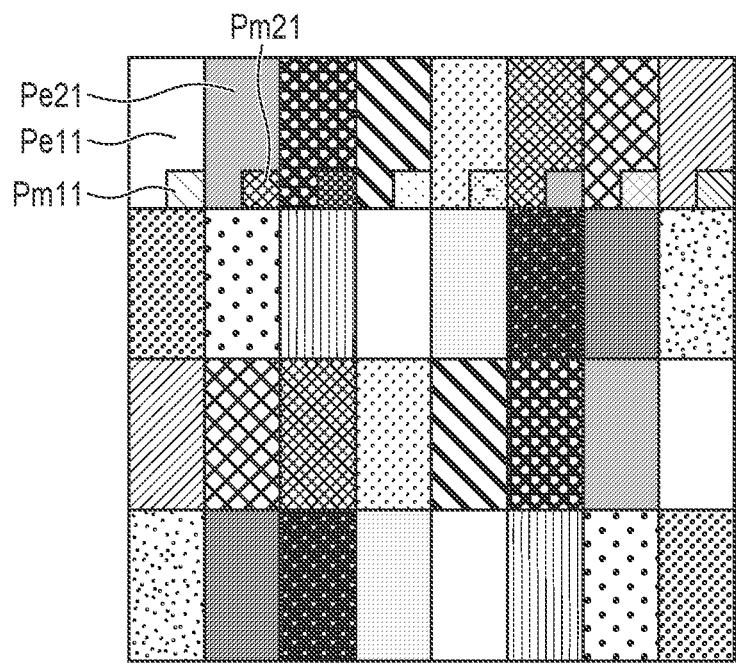
FIG. 11 is a diagram illustrating an example of displaying an expected color and a measured color on a chart of a different patch size according to an embodiment.

Feature 3: The present invention is characterized in that the object indicating the measured color is displayed in a manner suppressing a part of the chart features (connection between patches, patch size, patch shape, etc.). Specifically, the present invention is characterized in that the display portions of the measured colors are not connected between adjacent patches, as illustrated in FIGS. 9A to 9D, for example. Furthermore, the displayed shape and size of the measured color Pmxy may be fixed similarly to FIG. 9A even when the patch size in the chart information 600 is 10×20 mm, as illustrated in FIG. 11, for example. Alternatively, a measured color may be displayed by selecting a size pattern from a plurality of size patterns, in accordance with the patch size of the chart information 600.

Displaying the object indicating the measured color in a manner suppressing a part of the chart feature (connection between patches, patch size, patch shape, etc.), allows for performing chart determination of the colorimetric target based on the appearance of the expected color consistently from the display before the colorimetry to the display after the colorimetry. In this way, it is possible to suppress the display change of the patch group when an object indicating a measured color is additionally displayed. The object indicating the measured color is a piece of information to be added later, and therefore the object indicating the measured color is a part where a display change inevitably occurs. And thus, the feature 1, in which the connection between the expected colors are maintained, has a higher effect of suppressing the display change of the patch group than the feature 3 when the object indicating the measured color is additionally displayed.

Feature 4: The present invention is characterized in that there is only one boundary between the expected color Pexy and the measured color Pmxy in a patch in at least one of the x-direction and y-direction after the objects indicating measured colors are displayed, as illustrated in FIGS. 9A, 9B, 9D, 9E and 9F, for example. Although the boundary between the expected color and the measured color is illustrated as a straight line in the present embodiment, the boundary is not limited thereto and may be curved or may include an angle.

This is because, as can be seen in FIG. 9C, when there are a plurality of boundaries between the expected color Pexy and the measured color Pmxy in a single patch, the difference between the expected color Pexy and the measured color Pmxy is recognized for a plurality of times, which may provide a strong perception in the display change of the patch group when the measured color is additionally displayed. In particular, the display change of the patch group may be strongly perceived when the measured color is additionally displayed, because the difference at the boundary from the expected color to the measured color and the difference at the boundary from the measured color to the expected color are recognized as separate differences.

Feature 5: The present invention is characterized in that the number of colors included in the left side of the first column and the upper side of the first row of the patch display group constituting the chart is unchanged after the object of measured color is displayed, as illustrated in FIGS.

9A to 9C, for example. This is because the user generally determines the number of patch row and number of patch column in the patch display group included in the chart by the left side of the first column and the upper side of the first row rather by the inner side of the patch display group.

It is assumed in the present invention that the expected color and the measured color are displayed adjacent to each other while satisfying at least the aforementioned feature 1. Additionally satisfying at least one of feature 2, feature 3, feature 4 and feature 5 makes it possible to further suppress the colorimetry operation errors and further facilitate distinguishing a display difference due to the difference between the expected color and the measured color from a display difference due to a colorimetry operation error. Although in the display methods of measured colors in FIGS. 9A to 9F, the display methods having all the features 1 to 5 are the methods in FIGS. 9A and 9B, this is also merely an example and the present invention is not limited thereto. As illustrated in FIGS. 9A, 9B, and 9D to 9F, an object indicating a measured color may be displayed such that one vertex thereof coincides with one vertex of the patch display according to a corresponding expected color.

The display method of a patch display of expected colors and objects of measured colors at Step 3 (colorimetry process) of the colorimetric application 106 has been described, which is a characteristic of the present embodiment. Here, FIGS. 8 and 9A to 9F have been described without displaying frame lines surrounding the patches, boundary lines between patch displays, and frame lines surrounding expected colors and measured colors. However, it is also intended that presence of frame lines surrounding the patches, boundary lines between patch displays, and frame lines surrounding expected colors and measured colors also lies within the scope of the present invention.

As has been described above, the information processing apparatus according to the present embodiment acquires information related to a chart, in which a plurality of patches are adjacently arranged, to be printed by a printing apparatus. In addition, the information processing apparatus causes the display unit to display a plurality of patch displays according to the acquired expected colors of the plurality of patches, and a procedure of sequentially measuring the plurality of patches formed on the chart by the colorimetric apparatus, and sequentially acquires a measured value for each patch measured by the colorimetric apparatus. Objects indicating the measured colors based on the measured values for each acquired patch are sequentially displayed in a manner superimposed on a part of the patch display according to the corresponding expected color such that the display portions of respective expected colors between at least one pair of adjacent patch displays is connected after the objects are displayed. As such, according to the present embodiment, the colorimetric application 106 displays patches of expected colors in the same patch arrangement as that of the chart at a stage before colorimetry. Subsequently, objects indicating measured colors are displayed to be adjacent to expected colors in different sizes or shapes from the patch display of expected colors, while keeping the adjacent state of expected colors between adjacent patch displays after objects indicating measured colors are displayed. Furthermore, measured colors between patch displays may not be connected, boundary between the expected color and the measured color in the patch may be one, and the number of colors included in the left side of the first column and the upper side of the first row of the patch display group may be unchanged before and after the display of the objects of the measured colors.

By maintaining the structural representation of the chart layout by the expected colors before and after display of the measured colors, visual checking of the chart and the colorimetric current row of the colorimetric target in the colorimetry process is facilitated, whereby occurrence of colorimetry operation errors can be suppressed. Here, a colorimetry current row refers to a predetermined row in the chart currently prompting colorimetry. Additionally, in the occurrence of a colorimetry operation error, by suppressing the display change associated with displaying of the measured color, the comparison between the expected color and the measured color are easily focused, whereby distinguishing the display difference due to the difference between the expected color and the measured color from the display difference due to the colorimetry operation error is facilitated. Therefore, it is possible to easily notice colorimetry operation errors while occurrence of colorimetry operation errors are suppressed.

Second Embodiment

In the following, a second embodiment of the present invention will be described. As a display method of a current row, a method of surrounding the current row with a frame line is conceivable. However, a boundary may appear due to a difference of colors between patches, and thus the frame line of the current row may be inconspicuous. In addition, there is a problem that the difference between patch displays before colorimetry and after colorimetry is small when the expected color and the measured color are particularly close to each other, and thus the progress of colorimetry operation of all the patches is not easily grasped.

The present embodiment therefore emphasizes the current row by a surface manner such that the display colors of the patches are discriminated at Step 3 (colorimetry process) of the colorimetric application 106, instead of emphasizing the current row by adding a frame line. Since the components and control are similar to those of the aforementioned first embodiment, only the differences will be described.

Figure 7:
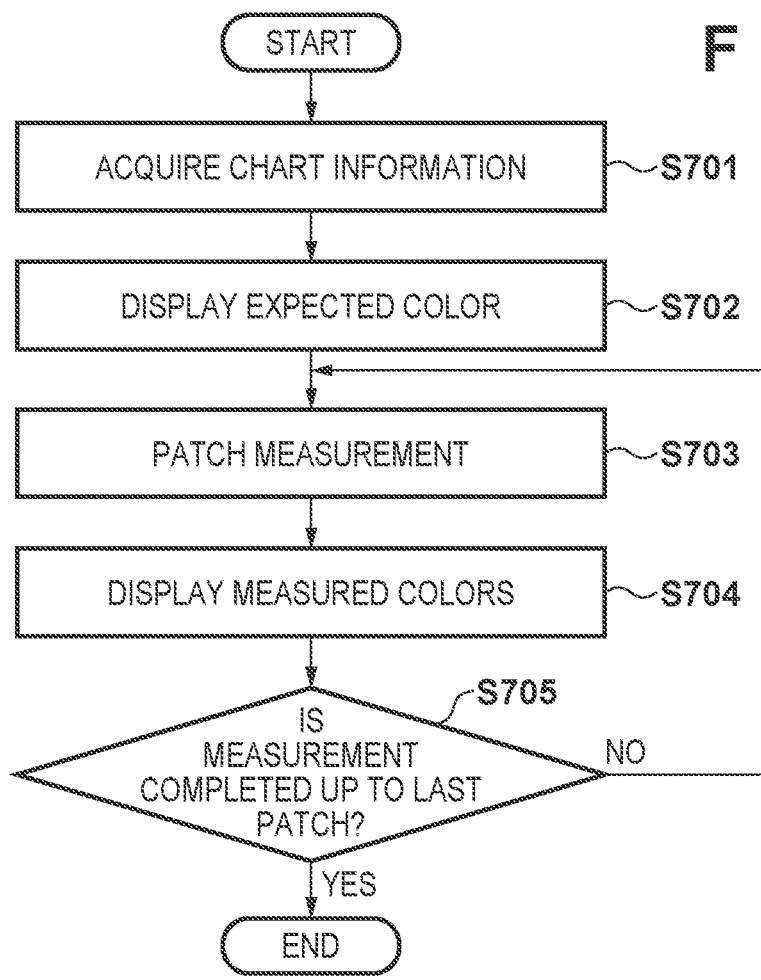
FIG. 7 is sequence diagram illustrating a process of colorimetry process of a colorimetric application according to an embodiment.
Figure 10:
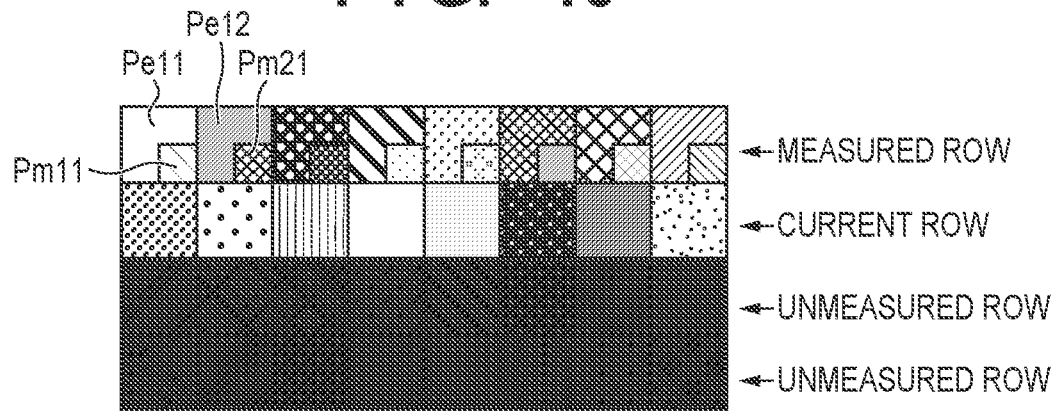
FIG. 10 is a diagram illustrating an example of a display method of a current row and unmeasured rows in subsequent rows according to an embodiment.

The present embodiment performs the patch display that makes the current row conspicuous by the surface manner, throughout the period from the patch measurement at S703 until the measurement of the last patch is completed at S705 in FIG. 7. As a specific display method for making the current row inconspicuous by the surface manner, for example, the expected color for unmeasured rows in subsequent rows with respect to the current row is displayed changing at least one of color related parameters in comparison with the original display color. The color related parameters include at least one of brightness and saturation. Here, display of an expected color before colorimetry (unmeasured row) has an intended use of suppressing operation errors of performing colorimetry of different charts, as has been described above for FIG. 8. Therefore, when the expected color before colorimetry (unmeasured row) is displayed in a different color from the original display color, at least one of the brightness and the saturation is changed as a whole to avoid recognition errors of the chart. FIG. 10 illustrates an example thereof. FIG. 10 illustrates a situation of displaying the unmeasured rows in subsequent rows with respect to the current row, by changing at least one of the brightness and the saturation over the entire row. Although colorimetry units and updating units of measured colors are performed row-by-row in the present embodiment, the units are not limited thereto.

As has been described above, the present information processing apparatus displays unmeasured patch displays subsequent to a patch display displayed in predetermined units currently prompting for measurement, by changing at least one of color related parameters (at least one of brightness and saturation) from a corresponding expected color. For example, in contrast to displaying the measured row and the current row in the original display color, in the present embodiment, unmeasured rows in subsequent rows are displayed with different brightness and saturation from those of the original display color. In this way, the display color is provided with contrast by the surface manner with the current row being the boundary, which can suppress the occurrence of an operation error of performing colorimetry of a different row. In addition, measured rows and unmeasured rows are displayed in different colors by the surface manner, and thus the progress of the colorimetry operation over all the patches can be easily checked.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-073679, filed Apr. 27, 2022, which is hereby incorporated by reference herein in its entirety.

What is claimed is:

1. An information processing apparatus comprising:
at least one memory device that stores a set of instructions; and
at least one processor that executes the set of instructions to:
generate a first chart including a first reference patch and a second reference patch;
generate a first read result patch and a second read result patch based on a read result obtained by reading the first reference patch and the second reference patch; and
generate a second chart including the first reference patch and the second reference patch, and the first read result patch and the second read result patch,
wherein, in the first chart, the first reference patch and the second reference patch are arranged adjacent to each other, and
wherein, in the second chart, the first read result patch is arranged adjacent to the first reference patch, the second read result patch is arranged adjacent to the second reference patch, and the first reference patch and the second reference patch are arranged adjacent to each other.

2. The information processing apparatus according to claim 1, wherein, in the second chart, the first read result patch and the second read result patch are different in size or shape from the first reference patch and the second reference patch.

3. The information processing apparatus according to claim 1, wherein, in the second chart, the first read result patch and the second read result patch are not arranged adjacent to each other.

4. The information processing apparatus according to claim 1, wherein in the second chart, the first read result patch includes one boundary with the first reference patch, or the second read result patch includes one boundary with the second reference patch.

5. The information processing apparatus according to claim 1, wherein, in the first chart and the second chart, a number of colors at an upper side and a left side of the first reference patch and the second reference patch is unchanged.

6. The information processing apparatus according to claim 1, wherein, in the second chart, the first reference patch and the first read result patch share at least one point, and the second reference patch and the second read result patch share at least one point.

7. The information processing apparatus according to claim 1, wherein the at least one processor further executes the set of instructions in the memory device to:
perform measurement of at least one of each predetermined unit reference patch object, each row object on which a reference patch is arranged, or each page object having the first reference patch and the second reference patch, and
display a reference patch display not measured, which is subsequent to reference patch of an object to be measured, with changing at least one parameter of display relating to the reference patch.

8. The information processing apparatus according to claim 7, wherein the parameter relating to the display includes at least one of brightness and saturation.

9. The information processing apparatus according to claim 1, wherein the first read result patch or the second read result patch is displayed with changing at least one of patch size or aspect ratio of the first reference patch or the second reference patch formed in the chart.

10. The information processing apparatus according to claim 1, wherein the first read result patch or the second read result patch is changed in accordance with a display size of the first reference patch or the second reference patch.

11. The information processing apparatus according to claim 1, wherein the first read result patch or the second read result patch is displayed in a manner satisfying at least one of:
   being different in size or shape from the first reference patch or the second reference patch,
   the first read result patch or the second read result patch being not connected,
   a boundary with the first read result patch and the second read result patch being one, and
   a number of colors at an upper side and a left side of the first reference patch and the second reference being unchanged in the first chart or the second chart.

12. The information processing apparatus according to claim 1, wherein the at least one processor further executes the set of instructions in the memory device to:
   generate a reading procedure for reading the first chart; and
   display the generated procedure on a display unit.

13. A control method for an information processing apparatus, comprising:
   generating a first chart including a first reference patch and a second reference patch;
   generating a first read result patch and a second read result patch based on a read result obtained by reading the first reference patch and the second reference patch; and
   generating a second chart including the first reference patch and the second reference patch, and the first read result patch and the second read result patch,
   wherein, in the first chart, the first reference patch and the second reference patch are arranged adjacent to each other, and
   wherein, in the second chart, the first read result patch is arranged adjacent to the first reference patch, the second read result patch is arranged adjacent to the second reference patch, and the first reference patch and the second reference patch are arranged adjacent to each other.

14. A non-transitory computer-readable storage medium storing a computing program for causing a computer to execute each process of a control method of an information processing apparatus, the control method comprising:
   generating a first chart including a first reference patch and a second reference patch;
   generating a first read result patch and a second read result patch based on a read result obtained by reading the first reference patch and the second reference patch; and
   generating a second chart including the first reference patch and the second reference patch, and the first read result patch and the second read result patch,
   wherein, in the first chart, the first reference patch and the second reference patch are arranged adjacent to each other, and
   wherein, in the second chart, the first read result patch is arranged adjacent to the first reference patch, the second read result patch is arranged adjacent to the second reference patch, and the first reference patch and the second reference patch are arranged adjacent to each other.

* * * * *